(12) United States Patent
Chen

(10) Patent No.: US 7,187,366 B2
(45) Date of Patent: Mar. 6, 2007

(54) INPUT SYSTEM WITH DETECTION OF COORDINATES

(75) Inventor: Chih-Cheng Chen, Tainan (TW)

(73) Assignee: Super Elite Technology Co., Ltd., Tainan Hsien (TW)

(*) Notice: Subject to any disclaimer, the term of this patent is extended or adjusted under 35 U.S.C. 154(b) by 325 days.

(21) Appl. No.: 10/414,775

(22) Filed: Apr. 14, 2003

(65) Prior Publication Data

US 2004/0201571 A1    Oct. 14, 2004

(51) Int. Cl.
*G09G 5/00* (2006.01)

(52) U.S. Cl. .................................. 345/173; 178/18.07

(58) Field of Classification Search ........ 345/173–175, 345/178; 178/18.01–18.08
See application file for complete search history.

(56) References Cited

U.S. PATENT DOCUMENTS

| | | | | |
|---|---|---|---|---|
| 2,241,544 A | * | 5/1941 | Dreyer, Jr. | 178/18.07 |
| 2,586,160 A | * | 2/1952 | Handel | 178/18.07 |
| 3,466,391 A | * | 9/1969 | Ellis | 178/18.08 |
| 4,081,603 A | * | 3/1978 | Davis et al. | 178/18.01 |
| 4,143,240 A | * | 3/1979 | Kobayashi et al. | 178/18.07 |
| 4,497,977 A | * | 2/1985 | Saito et al. | 178/18.08 |
| 4,710,595 A | * | 12/1987 | Kimura | 178/18.02 |

* cited by examiner

*Primary Examiner*—Amr A. Awad
*Assistant Examiner*—Steven Holton

(57) ABSTRACT

A coordinate detection input system includes two first elongated electric conductors with an insulation grounding device respectively, a control circuit and two elongated electric conductors with another insulation grounding device respectively. The two elongated electric conductors are disposed correspond to X-coordinate and Y-coordinate of the input system. The control circuit further includes a microprocessor, a field induced voltage transducer, an analog/digital converter and a signal transmission device. The elongated electric conductors are electrically connected to the microprocessor to induce electromagnetic fields sequentially every time after a zero checking has been done by the microprocessor. The field induced voltage transducer induces voltage in the magnetic field once the pulse current is operated to pass through any one of the electric conductors. The analog/digital converter transforms the induced voltages as coordinates and position of the field induced voltage transducer can be figured out accordingly.

1 Claim, 4 Drawing Sheets

INPUT SYSTEM WITH DETECTION OF COORDINATES

BACKGROUND OF THE INVENTION

1. Field of the Invention

The present invention relates to an input system with detection of coordinates and particularly to an input system, in which current produces an induced magnetic field and the induced magnetic field is transformed to induced voltage for finding out corresponding positions of coordinates.

2. Description of Related Art

Generally, there are two types of coordinates input systems, touch type and non-touch type available on the market.

The touch type coordinates input system as shown in FIG. 1 usually has a touch panel, which provides a circuit plane fully distributed with conductor loci, and an electric field of alternate current is arranged on the circuit plane. Hence, a corresponding curve of induced current can be generated once the magnetic coil of an oscillation source induces the circuit plane. Then, a scanning circuit is used to detect the induced current in the conductor loci to find a spot in the conductor loci, which provides the maximum induced current according to the principle of magnitude of induced current being proportional to the intensity of magnetic field. The maximum induced current is treated with an amplifying circuit and processed by an analog/digital converter (A/D) so that the coordinates along X-axis and along Y-axis can be obtained. Although the contact type coordinates input system has advantages such as simple operation and easy controlled circuit, shortcomings such as the mechanical device thereof easily becoming fatigued, deformed and fractured, the electronic switch thereof generating sparks and noise signal during power being on, and moisture and oil vapor easily seeping into the system are subjects worth us to overcome. A typical contact type coordinate input system is resistance type coordinates input system.

The non-touch type coordinates input system typically is capacitance type or inductance type coordinates input system. Similarly, the non-contact type coordinates input system has deficiencies such as complicated circuit, high production cost, interference resulting from noise signal being unable to be removed easily and occurring phenomena such as trembling input and unstable state of coordinates input.

SUMMARY OF THE INVENTION

An object of the present invention is to provide an input system with detection of coordinates, which is capable of allowing the coordinates input to be accessed more speedily and steadily than the traditional touch type and non-touch type systems.

Basically, the present invention is to utilize the fact that moving electrons are affected by the magnetic field to deviate moving paths in an electrified conductor and it results in electric charges accumulating at both lateral sides of the conductor to generate an electric field perpendicular to both the current and the magnetic field. Once a balanced steady state is reached, the electrified electrons receive the power of the electric field and counterbalance the magnetic force so that the current is not affected by the magnetic field any more. Hence, the induced electric field can be obtained by way of measuring voltage at both lateral sides of the conductor. Under this circumference, the greater the electric field is, the greater the induced magnetic field is. As a result, the measured voltage becomes greater too.

BRIEF DESCRIPTION OF THE DRAWINGS

The present invention can be more fully understood by reference to the following description and accompanying drawing, in which.

DETAILED DESCRIPTION OF THE PREFERRED EMBODIMENT

Figure 1:
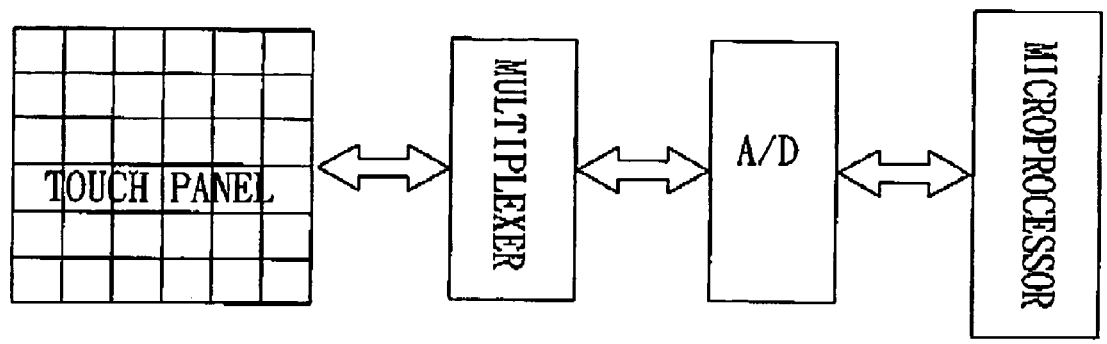
FIG. 1 is a block diagram of a conventional touch type coordinates input system.
Figure 2:
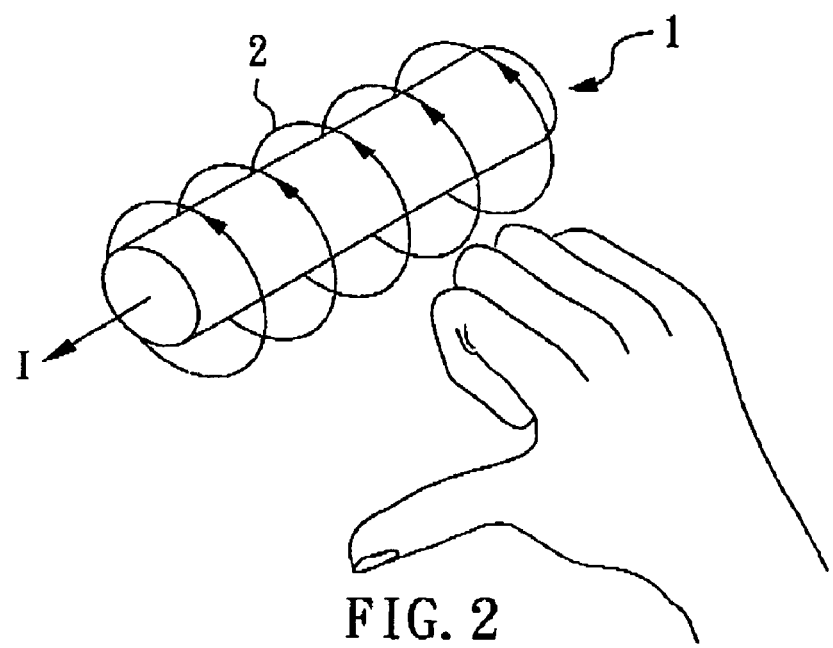
FIG. 2 is a perspective view illustrating Ampere's right-handed screw law.
Figure 3:
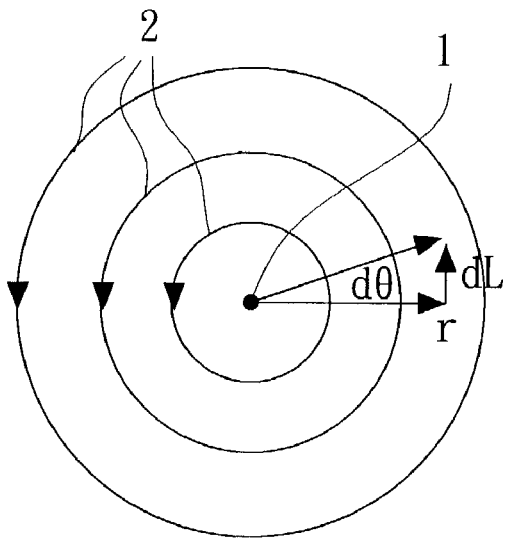
FIG. 3 is a cross section view of FIG. 2 illustrating the magnitude of the magnetic field being inversely proportional to a distance from an elongated electric conductor.

With reference to FIGS. 2 and 3, the principle of electromagnetism, which is applied by the present invention, is illustrated. Wherein, FIG. 2 illustrates the Ampere's right-handed screw law in which an input current 1 moves along an elongated electric conductor 1 and a magnetic field is formed surrounding the elongated electric conductor 1. The field intensity is defined as H at a radius r as shown in FIG. 3 and from the following equation:

$$\psi H \cdot dL = I \qquad (1)$$

wherein, $dL$ is a route of closed integration;

and $dL = \Sigma r \cdot d\theta$ so that $\Sigma r \cdot d\theta$ is substituted $dL$ in (1)

$$\psi H \Sigma r d\theta = I \qquad (2)$$

Further, the magnetic flux $B = \mu H$ and $B/\mu$ is substituted H in equation (2)

Then, $$B/\mu \Sigma r d\theta = I \qquad (3);$$

due to $\Sigma r d\theta = 2\pi r$, $2\pi r$ is substituted $\Sigma r d\theta$ in equation (3), thus $$(B/\mu) \cdot 2\pi r = I$$

$$B = (\mu/2\pi r)I \qquad (4)$$

Figure 4:
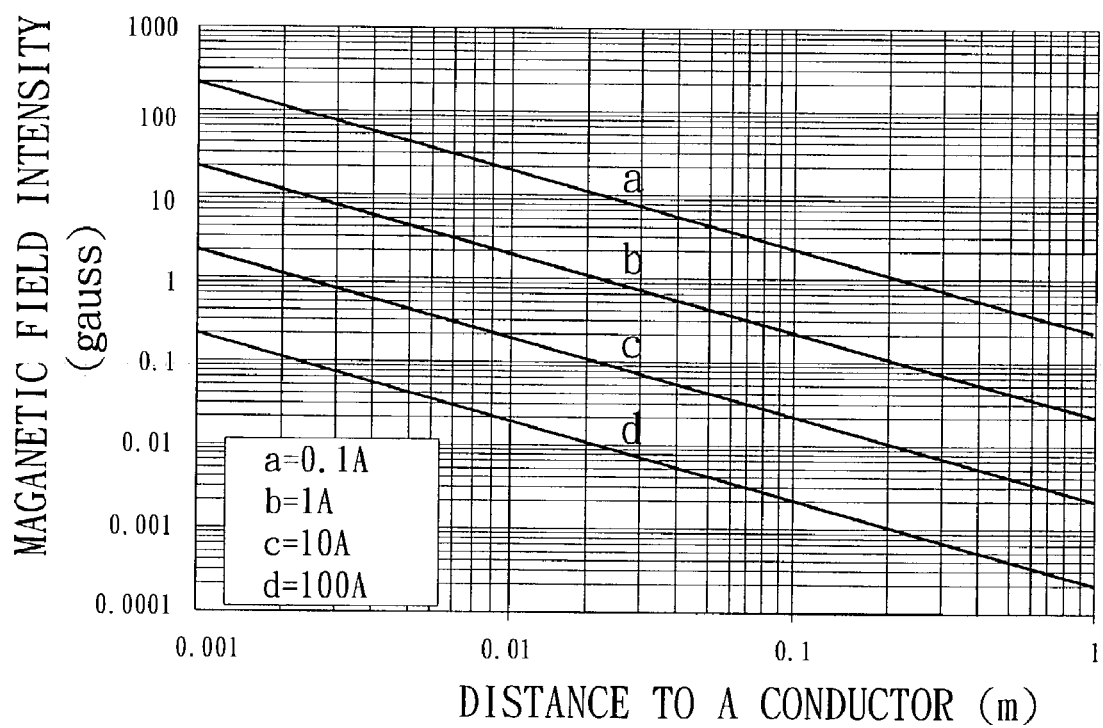
FIG. 4 is a chart of calculated magnitudes of the magnetic field with respect to the distance to the electric conductor.

It is known that the magnitude of the magnetic field is inversely proportional to the radius r, which actually is a distance of the magnetic field to the elongated electric conductor as shown in FIG. 4.

Figure 5:
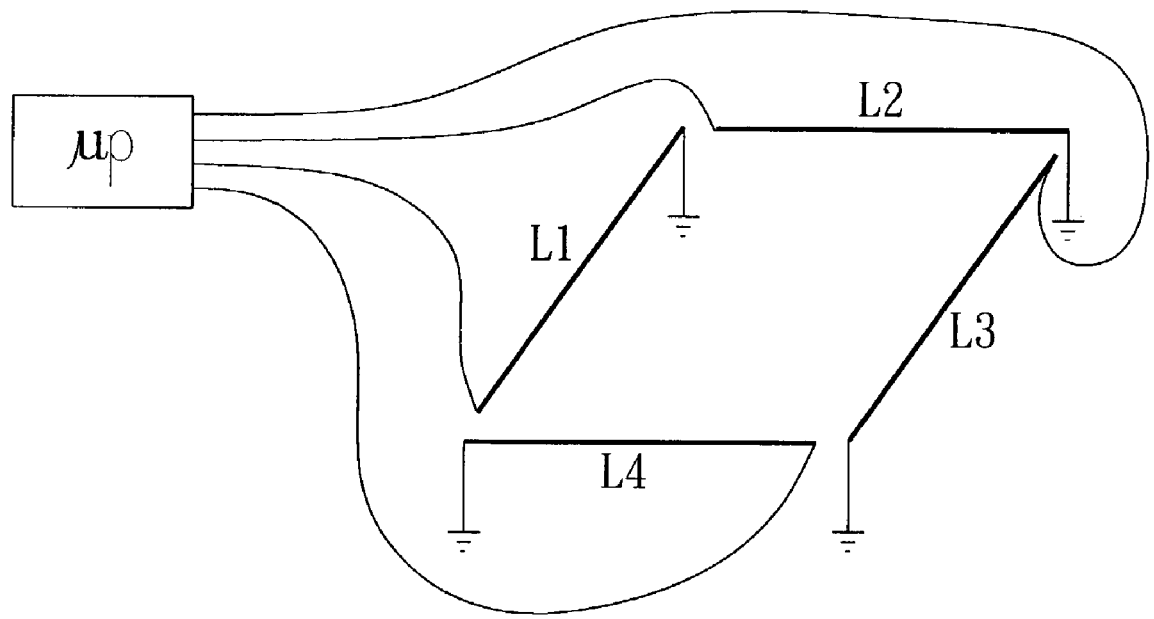
FIG. 5 is a perspective view illustrating a basic structure of an input system for detecting coordinates according to the present invention.
Figure 7:
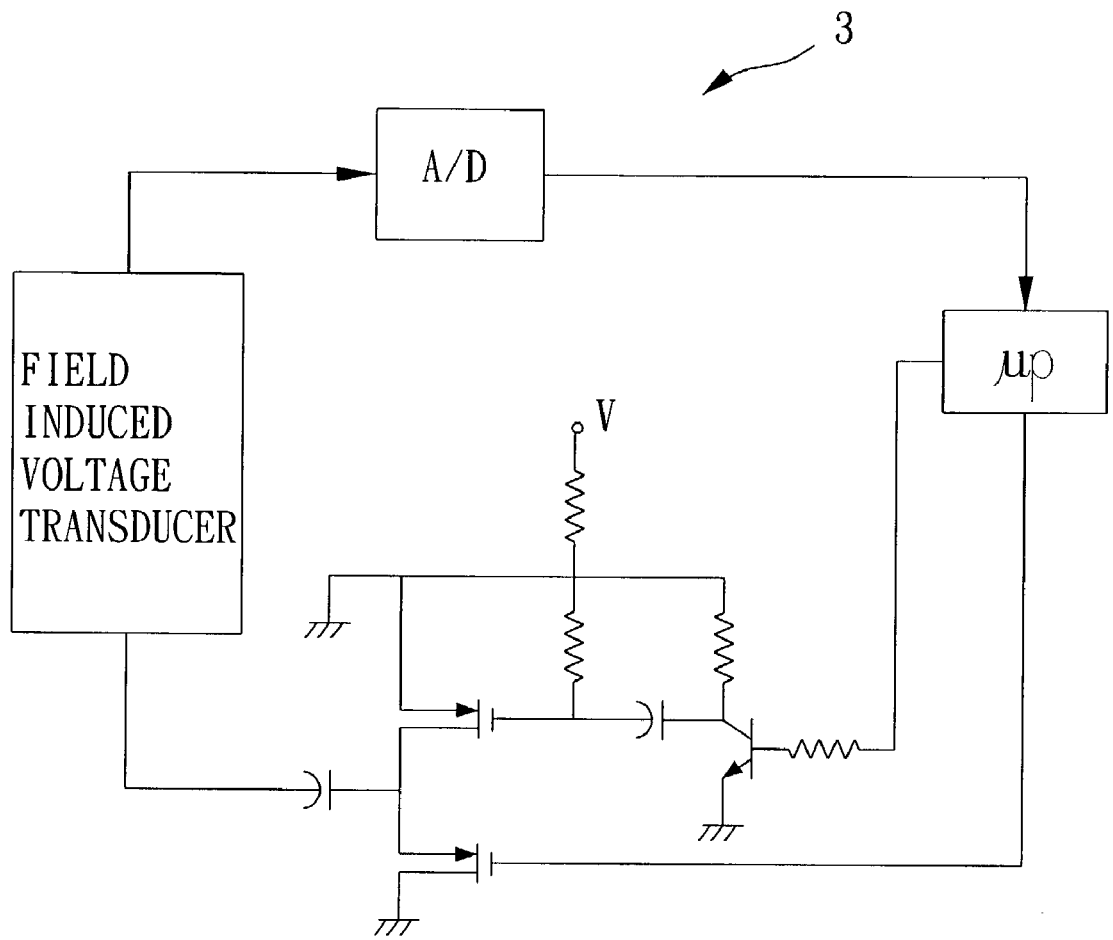
FIG. 7 is a circuit diagram of the control circuit of the input system for detecting coordinates according to the present invention.

Referring to FIGS. 5 and 7, the input system for detecting coordinates according to the present invention mainly includes two elongated electric conductors L1, L2 as an X-coordinate and a Y-coordinate with an insulation grounding device (not shown) a control circuit 3 and another two elongated electric conductors L3, L4 with a grounding insulation device (not shown). The electric conductors L3, L4 are disposed at the opposite sides of the two electric conductors L1, L2 for enhancing accuracy of measurement. It is noted that the grounding insulation device includes a resistor-capacitor device at the grounding end of each electric conductor. Because the grounding device is conventional, no further detail will be described. It can be seen in FIG. 5 that an end of the respective electric conductors L1, L2, L3 and L4 thereof is electrically connected to a microprocessor μP in the control circuit respectively. The control circuit 3 further basically includes a field induced voltage transducer, an analog/digital (A/D) converter and a signal transmission device (not shown) except the microprocessor. The field induced voltage transducer is electrically connected to the A/D and the A/D is attached to the microprocessor or externally outside the microprocessor for electrically connecting with the microprocessor.

Figure 6:
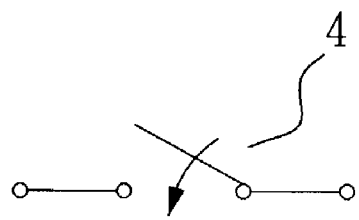
FIG. 6 is a front sectional view of a button switch, which is provided on a field induced voltage transducer in a control circuit of the present invention.

Referring to FIGS. 5 and 7 again, the control circuit 3 provides a steady pulse power source controlled by the microprocessor μP and pulse current can be sent to one of the elongated electric conductors L1, L2, L3 and L4 via the microprocessor μP and the electric conductor, which, for instance, is the electric conductor L1, generates an electromagnetic field. The field induced voltage transducer in the control circuit is a magnetic effective component, which is capable of being carried by the user to a position in the area enclosed by the electric conductors L1, L2, L3 and L4 to induce a voltage corresponding to the elongated electric conductor L1. The magnitude of the induced voltage depends on the distance between the electric conductor L1 and the field induced voltage transducer as shown in FIG. 4. Further, it can be seen in FIG. 8, because the induced voltage is inversed inversely proportional to a distance from the field induced voltage transducer to the corresponding elongated electric conductor linearly, values of corresponding coordinates X and Y can be figured out according to the linear relation shown in FIG. 8. Due to the voltage value having linear relation with X-coordinate or Y-coordinate depending on the distance to the electric conductor 11 is a vertical distance or a horizontal distance, the voltage value then is transformed as the corresponding value of X-coordinate or Y-coordinate by the analog/digital converter A/D. By the same token, in case of the pulse current being sent to the electric conductor L2, the other coordinate of the field induced voltage transducer can be obtained with the same way. Of course, when the pulse current is sent to the electric conductors L3 and L4 respectively, the X-coordinate and the Y-coordinates of the field induced voltage transducer too. The provision of electric conductors L3 and L4 is for enhancing accuracy of the X-coordinates and the Y-coordinates. A button switch 4 as shown in FIG. 6 is disposed on the field induced voltage transducer (not shown) for the transducer being capable of sending an ON signal to the microprocessor μP via the signal transmission device (not shown) as soon as the button switch is pressed down to start to find out the X-coordinate and the Y-coordinate of the transducer. Then, the microprocessor μP performs an operation of zero checking in the overall magnetic field and the zero checking is executed by software provided in the microprocessor μP before the pulse current can be sent to any one of the four elongated electric conductors L1, L2, L3 and L4. As the foregoing, when the pulse current is sent out to pass through the elongated electric conductor L1, the field induced voltage transducer induces a corresponding voltage value and the voltage value is transformed to an X-coordinate value via the analog/digital converter A/D. Similarly, when the pulse current passes through the elongated electric conductor L2, the field induced voltage transducer induces anther corresponding voltage value and the corresponding voltage value is converted to a Y-coordinate value via the analog/digital converter A/D.

In order to enhance accuracy for the system, the pulse current passing through the elongated electric conductors L1, L2, L3 and L4 is a mean value of several transferred pulses. The elongated electric conductors L3, L4 are auxiliary sample devices with a purpose of promoting the stability and the accuracy of the system.

Figure 8:
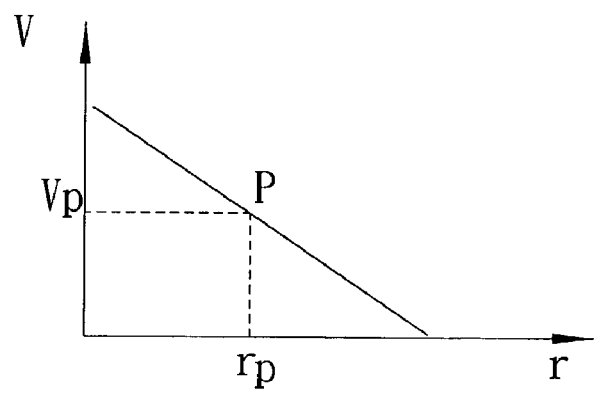
FIG. 8 is a coordinate graph illustrating a linear relation of a voltage $V_p$ induced by a field induced voltage transducer in the control circuit with respect to a distance $r_p$, which distance is the distance from the field induced voltage transducer to an elongated electric conductor shown in FIG. 5.

It can be seen in FIG. 8 that a voltage $V_p$ induced by the field induced voltage transducer has a linear relation with a distance $r_p$ to the corresponding elongated electric conductor. When a pressed operation point of the button switch 4 on the field induced voltage transducer is closer to the elongated electric conductor through which the pulse current passes, a larger induced voltage $V_p$ can be obtained due to larger induced magnetic field there. Because the converted value accessed by the analog/digital converter A/D corresponds to a position so that the converted value of the analog/digital converter A/D stands for the position of the pressed operation point of the button switch 4 directly.

As the foregoing, the input system with detection of coordinates according to the present invention is surrounded with the elongated electric conductor L1, L2, L3, L4 and the electric conductors electrically connect with the microprocessor in the control circuit 3. The field induced voltage transducer in the control circuit is a magnetic effective component and in practice, the field induced voltage transducer can be implemented as a Hall effect sensor. In addition, the signal transmission device provided in the control circuit can be operated in a way of wire or being wireless.

Specifically, each of the four elongated electric conductors is connected to a power source controlled by a microcomputer at an end thereof and is connected to an insulation grounding device at another end thereof to prevent from unnecessary interferences.

It is appreciated that the input system with detection of coordinates according to the present invention provides a way of completely new thought and the system can be operated more speedily and more steadily.

While the invention has been described with reference to a preferred embodiment thereof, it is to be understood that modifications or variations may be easily made without departing from the spirit of this invention, which is defined by the appended claim.

What is claimed is:

1. An input system with detection of coordinates, comprising:

four elongated electric conductors, being disposed at four lateral sides of the system and an insulation grounding device being connected to an end of the electric conductors; and a control circuit, being arranged in the system, and the control circuit further comprising:

a microprocessor, electrically connected to another end of each of the four electric conductors to perform zero checking an overall magnetic field in an area surrounded by the electric conductors before the input system being operated and to control pulse current from a steady pulse power source before the pulse current being sent to the electric conductors;

a field induced voltage transducer, being capable of being carried to be disposed in the area surrounded by the electric conductors and providing a button switch;

a signal transmission device, being electrically connected to the button switch for sending a signal to the microprocessor once the button switch is pressed; and an analog/digital converter, being electrically connected to the field induced voltage transducer and connected to the microprocessor for converting a voltage to an X-coordinate value or a Y-coordinate value in the input system;

wherein, first two of the electric conductors are disposed to correspond to an X-coordinate and a Y-coordinate of the input system respectively and second two of the electric conductors are disposed opposite to the preceding two electric conductors to correspond to the X-coordinate and the Y-coordinate too;

whereby, when the button switch is pressed to allow the signal transmission device to send a signal to the microprocessor and the microprocessor performs a zero checking and sends the pulse current from the steady pulse power source to the elongated electric conductors, a magnetic field is produced to surround the electric conductors respectively such that the field induced voltage transducer induces a voltage corresponding to the magnetic field and the voltage is converted by the analog/digital converter as a first X-coordinate value, a first Y-coordinate value, a second X-coordinate value or a second Y-coordinate value depending on a distance between each of the electric conductors and the field induced voltage transducer being a vertical distance or a horizontal distance respectively.

* * * * *